US009827993B2

(12) United States Patent
Prokhorov

(10) Patent No.: US 9,827,993 B2
(45) Date of Patent: Nov. 28, 2017

(54) METHOD AND SYSTEM FOR IMPROVING RIDE QUALITY IN AN AUTONOMOUS VEHICLE

(71) Applicant: Toyota Motor Engineering & Manufacturing North America, Inc., Erlanger, KY (US)

(72) Inventor: Danil V. Prokhorov, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 29 days.

(21) Appl. No.: 14/995,365

(22) Filed: Jan. 14, 2016

(65) Prior Publication Data

US 2017/0203766 A1    Jul. 20, 2017

(51) Int. Cl.
*B60W 40/09*        (2012.01)
*G05D 1/00*         (2006.01)

(52) U.S. Cl.
CPC ........... *B60W 40/09* (2013.01); *G05D 1/0088* (2013.01)

(58) Field of Classification Search
CPC ............................. B60W 40/09; G05D 1/0088
USPC ......... 701/23, 37, 48, 96; 340/903, 435, 436
See application file for complete search history.

(56) References Cited

U.S. PATENT DOCUMENTS

| 6,244,986 B1* | 6/2001 | Mori | F16H 61/6648 |
| | | | 477/46 |
| 7,509,194 B2 | 3/2009 | Wheals et al. | |
| 7,512,487 B1 | 3/2009 | Golding et al. | |
| 8,892,310 B1 | 11/2014 | Palmer et al. | |
| 2005/0004732 A1* | 1/2005 | Berry | B60W 10/06 |
| | | | 701/48 |
| 2013/0325333 A1 | 12/2013 | Basson et al. | |
| 2014/0297115 A1* | 10/2014 | Kang | B60W 50/082 |
| | | | 701/37 |

OTHER PUBLICATIONS

Eriksson et al., "Tuning for Ride Quality in Autonomous Vehicle", Application to Linear Quadratic Path Planning Algorithm, Uppsala Universitet, Jun. 2015, (75 pages).

* cited by examiner

*Primary Examiner* — Tan Q Nguyen
(74) *Attorney, Agent, or Firm* — Christopher G. Darrow; Darrow Mustafa PC

(57) ABSTRACT

A vehicle control system is configured for autonomous control of at least one actuatable vehicle system or component. The control system includes one or more sensors disposed on a vehicle, and a computing device in communication with the one or more sensors. The computing device is configured to acquire feedback relating to a ride quality feature from a vehicle occupant, identify vehicle control parameters affecting the ride quality feature; identify at least one autonomously controlled vehicle system affecting values of the identified vehicle control parameters; determine revisions to the vehicle control parameters necessary to implement the feedback relating to the ride quality feature; perform control parameter revisions necessary to implement the feedback relating to the ride quality feature, and control operation of the at least one autonomously controlled system or component so as to effect the control parameter revisions needed to implement the feedback.

17 Claims, 6 Drawing Sheets

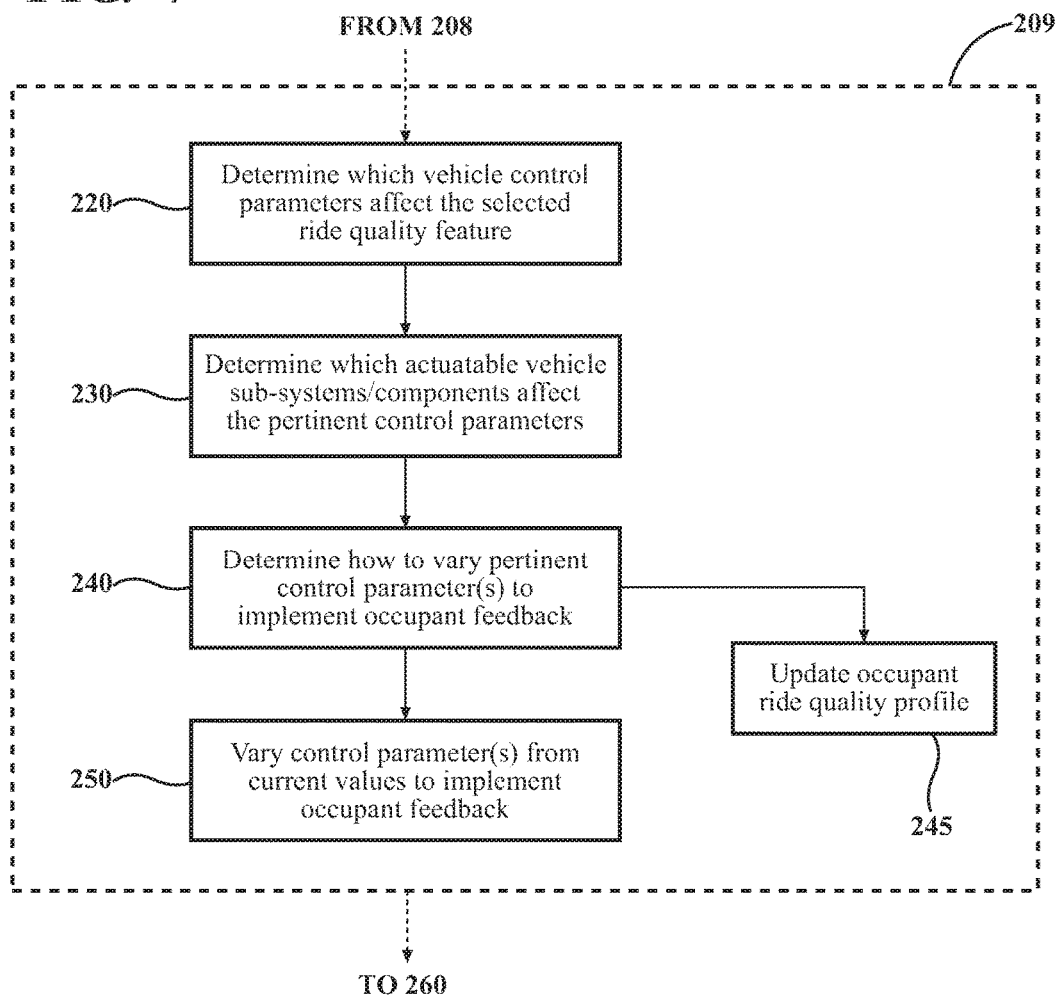

METHOD AND SYSTEM FOR IMPROVING RIDE QUALITY IN AN AUTONOMOUS VEHICLE

TECHNICAL FIELD

The present disclosure relates to autonomous control of vehicles, and, more particularly, to a method of implementing ride quality feedback from a vehicle occupant by modifying autonomous control of the vehicle responsive to the feedback.

BACKGROUND

Vehicles may be configured for completely or partially autonomous/automated operation. A vehicle thus configured will automatically execute certain driving operations in accordance with one or more pre-defined control schemes, without input from the vehicle occupant. From the perspective of a vehicle occupant, it is sometimes desirable for the occupant to be able to affect autonomous vehicle control for purposes of enhancing ride quality. Thus, it would be beneficial to have a vehicle control system and method which enables implementation of occupant ride quality feedback during autonomous operation of the vehicle.

SUMMARY OF THE INVENTION

In one aspect of the embodiments described herein, a vehicle control system is provided. The control system is configured for autonomous control of at least one actuatable vehicle system or component. The control system includes one or more sensors disposed on a vehicle, a computing device in communication with the one or more sensors, the computing device including one or more processors for controlling operation of the computing device, and a memory for storing data and program instructions usable by the one or more processors. The one or more processors are configured to execute instructions stored in the memory to acquire feedback relating to a ride quality feature, identify vehicle control parameters affecting the ride quality feature, identify at least one autonomously controlled vehicle system or component affecting values of the identified vehicle control parameters, determine revisions to the vehicle control parameters necessary to implement the feedback relating to the ride quality feature, perform control parameter revisions necessary to implement the feedback relating to the ride quality feature, and control operation of the at least one autonomously controlled system or component so as to effect the control parameter revisions needed to implement the feedback.

In another aspect of the embodiments of the described herein, a computer-implemented method of controlling at least one vehicle system or component is provided. The method includes steps of acquiring feedback relating to a ride quality feature affected by operation of the at least one system or component, and controlling operation of the at least one system or component responsive to the feedback.

In another aspect of the embodiments of the described herein, a computing device is provided. The computing device is in communication with at least one autonomously controllable actuatable vehicle system or component, and includes one or more processors for controlling operation of the computing device, and a memory for storing data and program instructions usable by the one or more processors. The one or more processors are configured to execute instructions stored in the memory to acquire feedback relating to a ride quality feature affected by operation of the at least one autonomously controlled system or component, and modify autonomous control of the at least one system or component responsive to the feedback.

BRIEF DESCRIPTION OF THE DRAWINGS

The accompanying drawings, which are incorporated in and constitute a part of this specification, illustrate embodiments described herein and together with the description serve to explain principles of embodiments described herein.

FIG. 7 shows one embodiment of another method of implementing occupant feedback relating to an occupant-selected ride quality feature.

FIG. 8 is a schematic view of one embodiment of a screen shot appearing in a visual display of the vehicle control system, prompting a vehicle occupant to select a ride quality feature.

DETAILED DESCRIPTION

The embodiments described herein relate to a vehicle control system configured for autonomous control of at least a portion of a vehicle. The control scheme employed for autonomously controlling the portion of the vehicle may be modified responsive to feedback received from a vehicle occupant. The feedback is related to various ride quality features which may be affected by operation of the autonomously controlled portions of the vehicle. A feedback-control loop may be employed to repeatedly adjust automated control parameters of the control system, thereby tuning the ride quality feature in accordance with occupant preferences.

Figure 1:
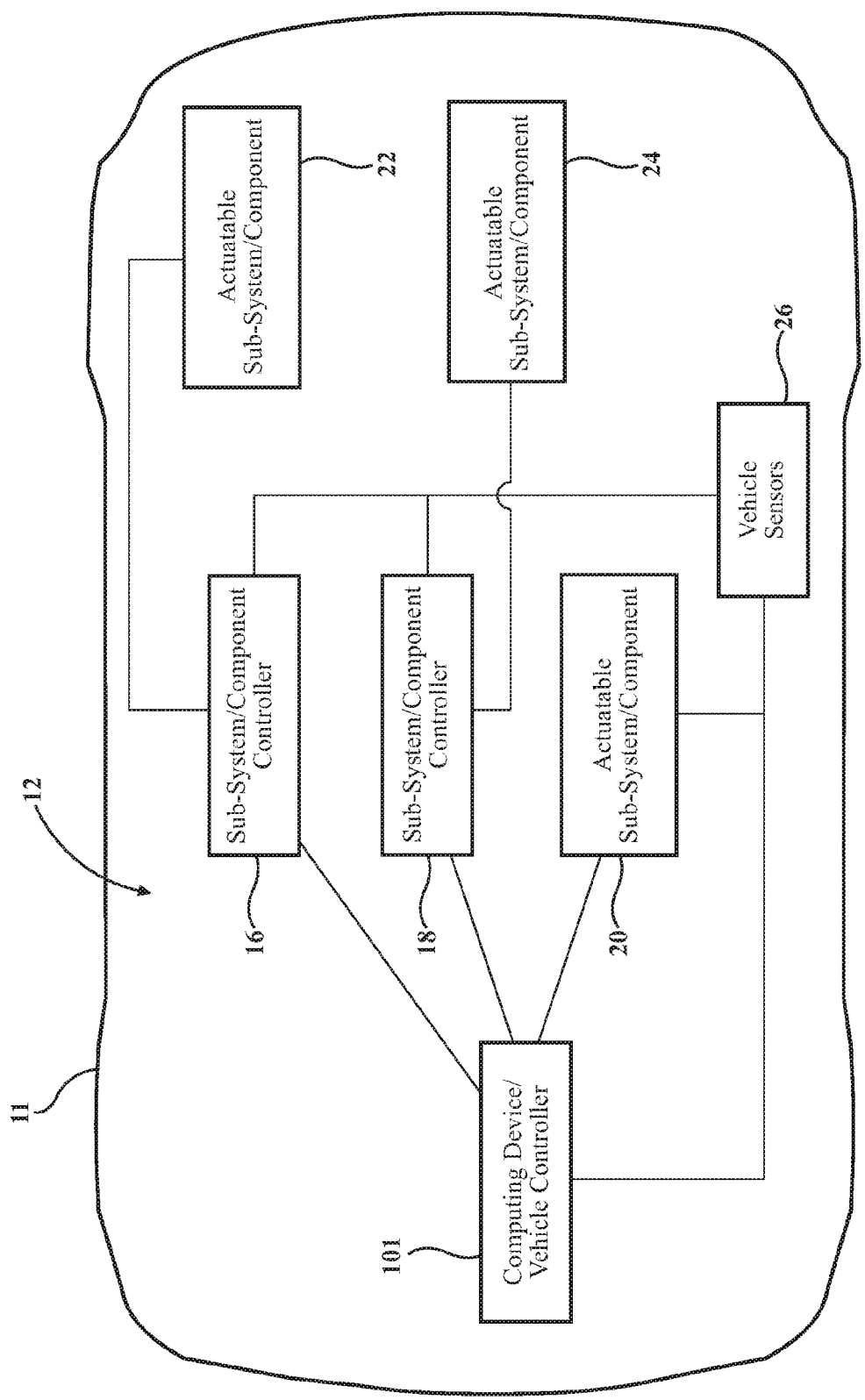
FIG. 1 is a schematic block diagram of a vehicle control system designed to receive and implement vehicle occupant feedback relating to various ride quality features.

FIG. 1 is a schematic block diagram of a portion of a vehicle 11 incorporating a vehicle control system 12 designed to receive and implement vehicle occupant feedback relating to various ride quality features. The vehicle incorporates at least one actuatable sub-system or component which is configured for autonomous control by one or more associated computing devices or controllers. The autonomous system or component may operate to control at least a portion of the vehicle without human input. The vehicle may also be configured for fully autonomous (i.e., driverless) driving.

While an assessment of "ride quality" is to some degree dependent on the particular vehicle occupant, the present disclosure describes a system and method for eliciting and receiving an occupant's feedback on various ride quality features, and for characterizing this feedback in terms of quantifiable and/or modifiable vehicle control parameters.

This enables the occupant's feedback to be implemented in controlling the vehicle during the current trip and also during future trips, thereby enhancing the occupant's driving experience.

As defined herein, the term "ride quality feature" refers to a characteristic of a ride that either positively or negatively impacts the occupant's riding experience, and which may be affected by one or more autonomous driving systems, sub-systems and/or components. Examples of ride quality features include smoothness of ride, following distance (behind another vehicle), and speed with which lanes are changed. For example, if the following distance determined and implemented by the autonomous driving system is too small for the occupant's preference, the occupant may experience anxiety or discomfort during driving Feedback from the vehicle occupant is utilized in modifying one or more associated automated vehicle control parameters. As defined herein, the terms "vehicle control parameter" and "automated control parameter" refer to a parameter that affects one or more ride quality features, and which is controllable by an autonomous driving system, actuatable sub-system and/or actuatable component so as to correspondingly control or influence one or more associated ride quality features.

As defined herein, the terms "actuatable sub-systems" and "actuatable components" refer to vehicle systems and components which incorporate and/or may be controlled by a computing device (for example, a suitable controller) responsive to occupant feedback, to provide values of vehicle control parameters needed to implement occupant feedback on ride quality features, thereby positively affecting the ride quality features and ensuring ride quality.

In some cases, a ride quality feature will be influenced by more than one vehicle control parameter. For example, increased ride smoothness may be implemented by increasing turn radius, reducing road speed during turns, controlling an active suspension system to provide a "softer" suspension, etc. Thus, with regard to the "ride smoothness" ride quality feature, associated vehicle control parameters may include vehicle acceleration and deceleration rates, road speed during turns, turn radius, and suspension stiffness.

As examples of vehicle control parameters and their associated actuatable sub-systems and components, vehicle acceleration and deceleration rates are a function of throttle operation (which may be controlled, for example, by an adaptive cruise control system or other throttle control system) and braking operation (which may be controlled by a suitable braking control system). Suspension stiffness may be controlled using an active suspension system. Turn radius may be controlled by a suitable steering control system incorporating a steering control module or controller (for example in a vehicle configured for fully automated (i.e., driverless) steering).

To varying degrees, ride quality features may be subjective or personal to a particular vehicle occupant. The system embodiments described herein enable these ride quality features to be adjusted or "tuned" according to vehicle occupant preferences by communicating the preferences to the vehicle controller, which then adjusts associated vehicle control parameters so as to implement the ride quality preferences to the greatest degree possible consistent with safety considerations.

As will be appreciated by one skilled in the pertinent the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media for executing the functions described herein. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is shows a schematic arrangement of a portion of a vehicle control system 12 in accordance with one embodiment described herein. Referring to FIG. 1, the vehicle control system 12 includes a computing device or system 101 and a vehicle sensor array 26 in communication with the computing device.

Figure 2:
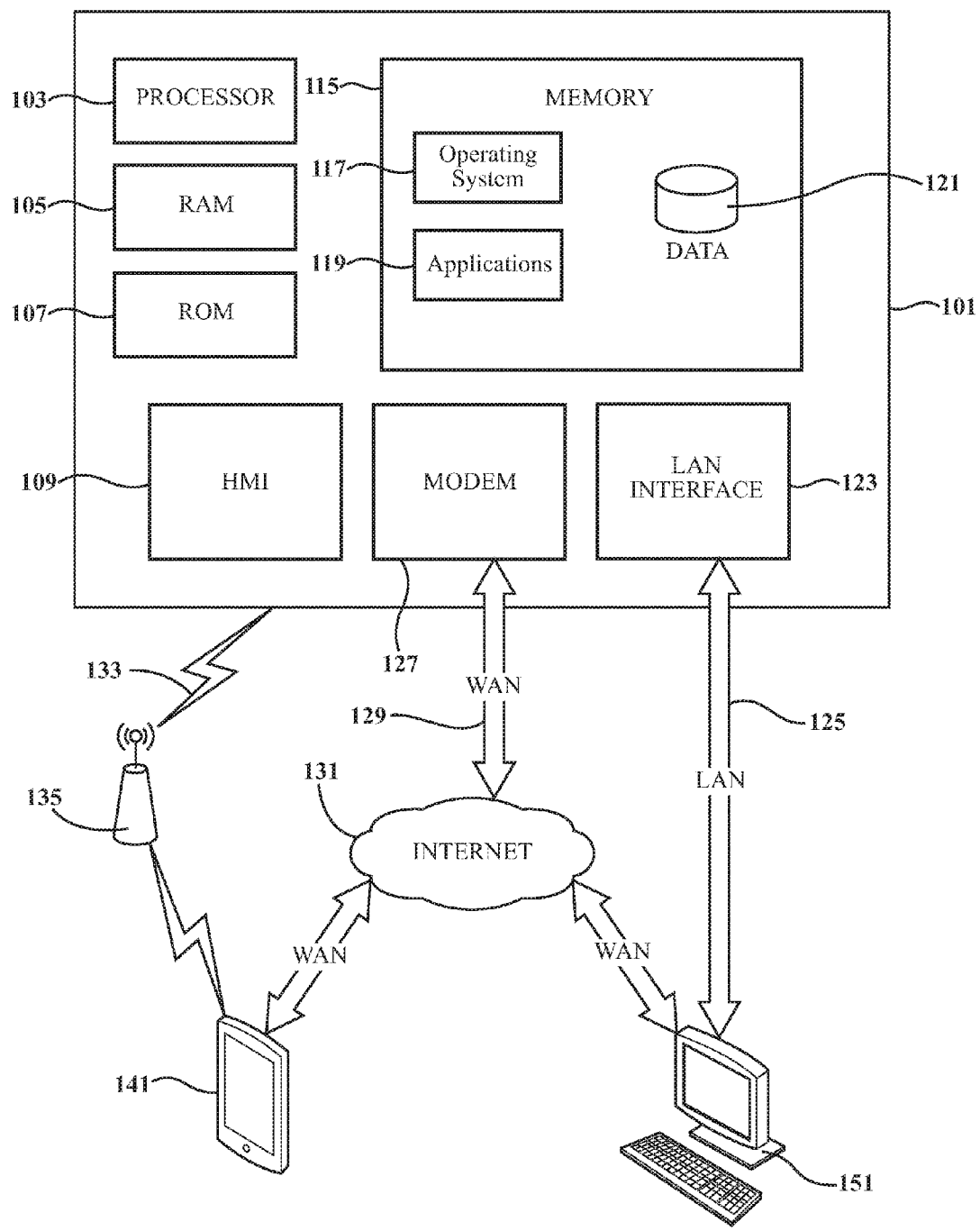
FIG. 2 is a diagram illustrating various components and devices of a computing device, according to one or more aspects of the disclosure.

FIG. 2 illustrates a block diagram of a computing device 101 in the vehicle control system 12 that may be used according to one or more illustrative embodiments of the disclosure. The computing device 101 may have a processor 103 for controlling overall operation of the device 101 and its associated components, including RAM 105, ROM 107, an input/output module or human-machine interface (HMI) 109, and computer-readable storage or memory 115. The computing device 101, along with one or more additional devices (e.g., specialized controllers 16, 18) may correspond to any of multiple systems or devices configured as described herein for functions such as autonomously (i.e., without vehicle operator or occupant input) operating the entire vehicle 11 or specific portions of the vehicle.

Computing device 101 may be embodied in a vehicle controller, for example. Computing device 101 may coordinate automated operations of the specialized controllers. Computing device 101 and/or any other computing devices may also be configured to elicit and receive feedback from a vehicle occupant relating to various ride quality features, to process this feedback and translate it into executable commands which may be transmitted to pertinent vehicle systems for implementation of the occupant feedback so as to enhance the occupant's driving experience. More specifically, in embodiments described herein, computing device 101 and/or any other computing devices may be configured to elicit and receive the vehicle occupant's feedback relating to selected ride quality features, to identify the vehicle control parameters affecting the selected ride quality features, and to determine the vehicle systems affecting the values of the control parameters. Computing device 101 and/or any other computing devices may also be configured to determine the revisions to the pertinent control parameters necessary to implement occupant ride quality feedback, to access the automated vehicle control routines, schemes, commands, etc. using the pertinent control parameters for vehicle control, and to perform the necessary revisions on the automated vehicle control routines, schemes, commands, etc. In embodiments where the automated vehicle control routines, schemes, commands, etc. for particular sub-systems are stored wholly or partially in an associated specialized controller, computing device 101 is configured to access the applicable control routines, schemes, commands, etc. stored in the pertinent specialized controller.

Computing device 101 and any other computing devices may also be configured to receive and store input from the sensor array 26, from any specialized control modules and from any actuatable vehicle component. The computing device 101 and any other computing devices may also be configured to receive and store the various sensor inputs so that they are time-correlated with simultaneous or contemporaneous drive events (for example, turns, accelerations, stops, lane changes, etc.), the occurrences of which may also be stored on the computing device(s) or in an associated memory. Computing device 101 and any other computing devices may also be configured to record the inputs received from the sensors, and to integrate, process and format these inputs into a graphic representation of a ride (or selected portion of a ride) experienced by the vehicle, for display and viewing by a vehicle occupant.

A computer-readable storage or memory 115 includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Control system 12 includes an array 26 of vehicle sensors designed to monitor various vehicle operational parameters and environmental conditions external to the vehicle. The sensor array includes various types of sensors in communication with actuatable vehicle subsystems and components and to associated specialized component controllers, for providing feedback on operations of the vehicle. For example, sensors 26 may detect and store data corresponding to the vehicle's location (e.g., GPS coordinates), speed and direction, rates of acceleration or braking, and specific instances of sudden acceleration, braking, and swerving. Sensors 26 also may detect and store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's various computing devices.

Additional sensors 26 may detect and store the external driving conditions, for example, external temperature, rain, snow, light levels, and sun position for driver visibility. For example, external cameras and proximity sensors 26 may detect other nearby vehicles, traffic levels, road conditions, traffic obstructions, animals, cyclists, pedestrians, and other conditions that may factor into a driving event data analysis. Sensors 26 also may detect and store data relating to moving violations and the observance of traffic signals and signs by the vehicle 11. Additional sensors 26 may detect and store data relating to the maintenance of the vehicle 11, such as the engine status, oil level, engine coolant temperature, odometer reading, the level of fuel in the fuel tank, engine revolutions per minute (RPMs), and/or tire pressure.

Vehicles sensors 26 also may include cameras and/or proximity sensors capable of recording additional conditions inside or outside of the vehicle 11. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, unsecured objects in the vehicle). Sensors 26 also may be configured to collect data a driver's movements or the condition of a driver. For example, vehicle 11 may include sensors that monitor a driver's movements, such as the driver's eye position and/or head position, etc. Additional sensors 26 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer.

Certain of vehicle sensors 26 also may collect information regarding the driver's route choice, whether the driver follows a given route, and to classify the type of trip (e.g. commute, errand, new route, etc.). In certain embodiments, sensors and/or cameras 26 may determine when and how often the vehicle 11 stays in a single lane or strays into other lanes. A Global Positioning System (GPS), locational sensors positioned inside the vehicle 11, and/or locational sensors or devices external to the vehicle 11 may be used to determine the route, lane position, and other vehicle position/location data. In addition, the various controllers in the vehicle may operate as data collectors 110 to provide data or inputs 115 via a CAN bus (not shown) provided to enable communication between the elements of the control system.

The data collected by vehicle sensors 26 may be stored and/or analyzed within the vehicle 11, and/or may be transmitted to one or more external devices. For example, the sensor data may be transmitted via telematics devices to one or more remote computing devices, such as a mobile device or laptop computer. Any data collected by vehicle sensors 26 may also be transmitted to any vehicle system or component requiring or utilizing the data for the purposes described herein. For example, the data collected by vehicle sensors 26 may be transmitted to computing device 101, to one or more specialized component controllers, or to the HMI 109.

If a controller requires an integrated or composite signal formed from outputs of multiple individual sensors, a known sensor fusion means (not shown)(incorporating, for example, a suitable Kalman filter) may be introduced between the sensor array (or the pertinent sensor(s)) and the pertinent controller. Also, if a sensor output signal requires pre-processing prior to use by a controller, a known pre-processing means (not shown) (for example, an A/D converter) may be introduced between the sensor array (or the pertinent sensor(s)) and the pertinent controller.

A plurality of actuatable sub-systems and/or components 20, 22, 24 are in operative communication with computing device 101 and sensor array 26 and effect various control commands for vehicle operation. For example, an actuatable sub-system in the form of an active suspension system (not shown) may be operable to support and cushion the vehicle during movement, in a manner known in the art. The control system 12 may also incorporate one or more specialized control modules or controllers 16, 18 in communication with sensor array 26, computing device 101 and associated actuatable components, for controlling (or assisting in control of) component operation. In addition, the specialized controllers 16, 18 may be computing devices themselves containing many or all of the same hardware/software components as the computing device 101 depicted in FIG. 2, described in further detail below.

Telematics systems, such as on-board diagnostics (OBD) systems installed within vehicles, may also be configured to access vehicle computing devices and sensor data and transmit the data to a display, a personal computer, a mobile device, or to an extra-vehicular data processing system or device. Telematics devices (not shown) may be computing devices containing many or all of the same hardware/software components as the computing device 101 depicted in FIG. 2. The telematics devices may receive vehicle operation and external environmental data from vehicle sensors 26, and may transmit the data to one or more external computer systems over a wireless transmission network. The telematics devices also may be configured to detect or determine additional types of data relating to real-time driving and the condition of the vehicle 11. In certain embodiments, the telematics devices may contain or may be integral with one or more of the vehicle sensors 26.

The telematics devices may receive vehicle driving data from vehicle sensors 26, and may transmit the data to an external data processing system or device. However, in other examples, one or more of the vehicle sensors 26 may be configured to transmit data directly to an external data processing system or device (not shown) without using a telematics device. Thus, the telematics devices may be optional in certain embodiments. Processing of the data as described herein may then be performed remotely from the vehicle. Alternatively, portions of the data processing may be performed remotely from the vehicle while other portions are performed within the vehicle.

Input/Output (I/O) module or HMI 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the computing device 101 to execute a series of computer-readable instructions to receive occupant feedback and to perform other interface-related functions as described herein.

Additionally, any of specialized controllers 16, 18 may include a computing device having some or all of the structural components described above for computing device 101. Specialized controllers 16, 18 are configured to control (or aid in controlling) associated actuatable vehicle sub-systems and components, in a manner known in the art. Examples of specialized controllers which may be incorporated into the vehicle include an engine control module (ECM), a powertrain control module (PCM), a transmission control module (TCM), a brake control module (BCM or EBCM), and a suspension control module (SCM).

The various computing devices may operate in a networked environment supporting connections to one or more remote computers, such as terminals/devices 141 and 151. Computing device 101 and any other computing devices and related terminals/devices 141 and 151, may include devices installed in vehicles, mobile devices that may travel within vehicles, or devices outside of vehicles that are configured to receive and process vehicle and driving data. Thus, the computing device 101 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, and the like), and may include some or all of the elements described above with respect to the computing device 101. The network connections depicted in FIG. 2 include a local area network (LAN) 125 and a wide area network (WAN) 129, and a wireless telecommunications network 133, but may also include other networks. When used in a LAN networking environment, the driving analysis computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133. These configurations provide various ways of enabling data, occupant ride quality feedback, and other information to be elicited, received, processed, and displayed exterior of the vehicle.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Additionally, one or more application programs 119 used by the computing device 101 may include computer executable for performing the other functions described herein (for example, eliciting and receiving feedback from a vehicle occupant relating to various ride quality features and other functions).

In one embodiment, occupant feedback is elicited and implemented using a reinforcement learning (RL) algorithm. Using this approach, during a driving trip, the vehicle control system 12 prompts the occupant for ride quality feedback. The control system 12 may alternatively be configured to receive occupant-initiated ride quality feedback (i.e., feedback input by the occupant after the occupant initiates a dialogue with the control system). This feedback may be implemented by modifying the control scheme(s) used to control vehicle operational factors affecting ride quality. After operation of the vehicle in accordance with the revised control scheme, the vehicle control system 12 prompts the occupant for ride quality feedback on the revised ride quality. While in operation, this embodiment of the system will constantly execute a loop including steps of eliciting occupant feedback on ride quality features and implementing the feedback to revise the ride quality features. This process constantly improves ride quality from the perspective of the occupant until either the ride quality level desired by the occupant has been reached, or no further adjustments to the control schemes affecting ride quality are desired or can be made. Alternatively, any other suitable approach for managing occupant-vehicle interaction may be employed.

Figure 3:
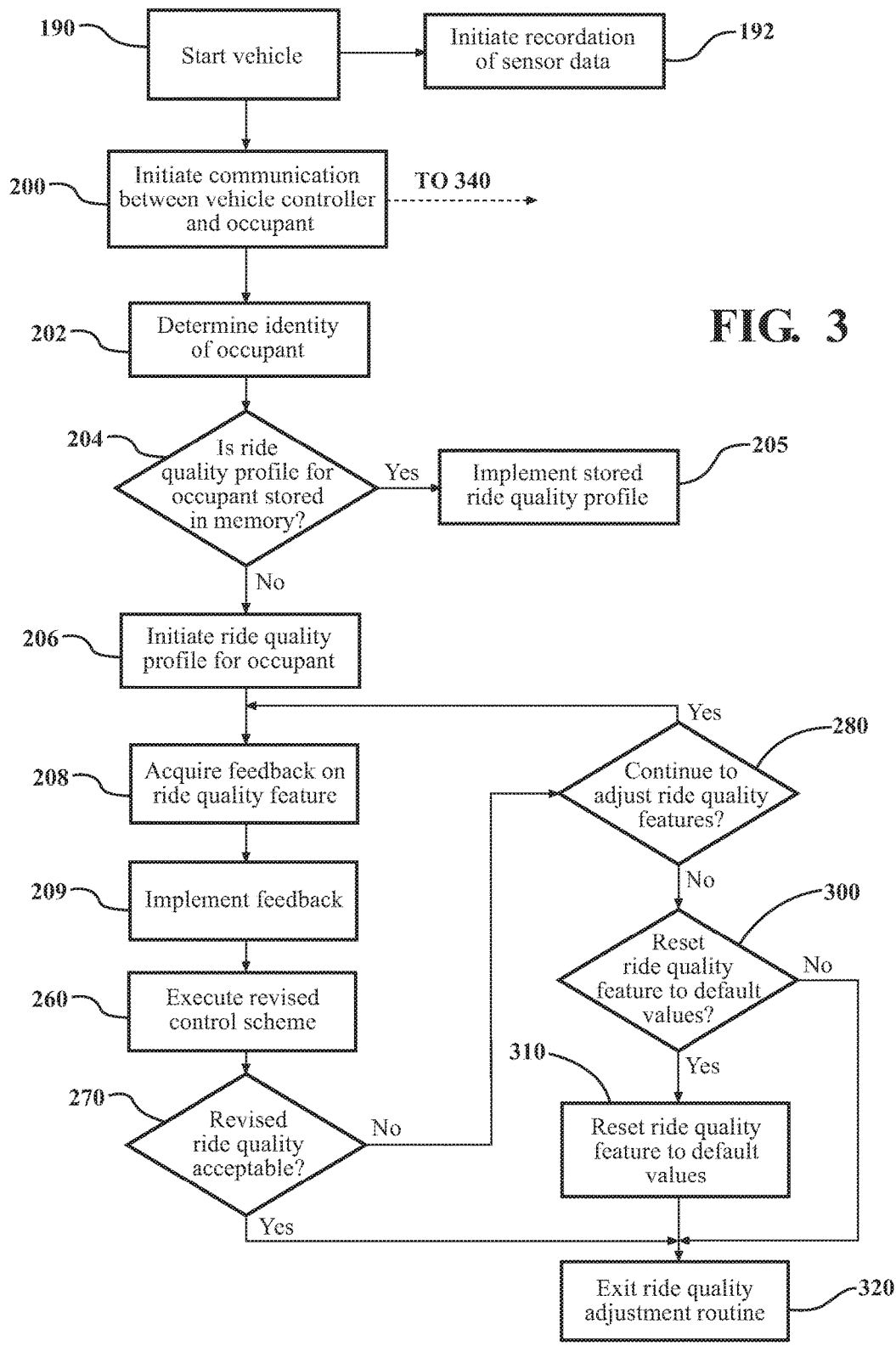
FIG. 3 is a flow diagram illustrating an example method of eliciting and implementing feedback on a ride quality feature from a vehicle occupant.

FIG. 3 shows a flow diagram detailing one mode of interaction between a vehicle occupant and the vehicle control system.

In block 190, the occupant starts the vehicle. This initiates (in block 192) recordation of all vehicle sensor and system operation and response data during the pending ride. In one embodiment, upon vehicle start-up, the vehicle control parameters are also set at predetermined factory default values or settings (set, for example, during fabrication of the vehicle). Starting of the vehicle also activates the HMI 109 to enable communication between the occupant and the vehicle control system.

In block 200, communication between the occupant and the vehicle control system is initiated through the HMI 109. The communication may occur during a current ride, in which ride quality feedback may be received and dynamically implemented by the control system 12 during the current ride. This may improve the ride quality of the remaining portion of the current ride. Alternatively, as described below, the communication may occur after the current ride has ended. The system may be configured so that communication may be initiated by a vehicle occupant alone, by the control system alone, or by either the vehicle occupant or the control system. The control system may initiate communication, for example, after execution of a driving maneuver or command involving a system or component controlled (at least in part) autonomously.

In block 202, the control system (through the HMI 109) queries the identity of the occupant. The system then (in block 204) determines if a ride quality profile for the occupant is stored in memory. The approach described below may be used to build or modify an individual ride quality profile (described in greater detail below) which is distinctive to a particular vehicle occupant. This enables ride quality preferences particular to a given occupant to be implemented (in block 205) by the system upon vehicle start-up. In block 206, if the system does not include an existing ride quality profile for the occupant, a new ride quality profile is initialized for the occupant.

In block 208, the control system acquires occupant feedback relating to a ride quality feature. In one embodiment, the control system prompts the vehicle occupant (via the HMI 109) to select a ride quality feature to provide feedback on. In an embodiment incorporating a visual or touch screen interface, the HMI 109 may display a list of ride quality features available for modification by the occupant. The occupant may select a ride quality feature from the menu by touch, the press of a suitable button or by voice command, depending on the interface architecture.

One example of a menu which may appear in a visual interface is shown in FIG. 8. Alternatively, in another example, the interface 109 incorporates and implements a voice recognition routine. The system presents ride quality feature modification options through a speaker, and receives occupant input through a microphone.

In one example of an audio/voice implementation of the system, the interface may prompt the user by audio to "Select one of the following ride quality features to modify: a) Ride smoothness; b) Following distance; or c) Speed of lane change." Alternatively, in another example of an audio/voice implementation of the system, the computing device servicing the interface may be configured to recognize certain keywords (for example, "Speed", "Bumpy", "Smooth") associated with various ride quality features. Voice recognition of one of these terms may result in a prompt presenting a menu of related ride quality options on which feedback may be provided.

The control system may be configured to permit adjustment of the selected ride quality feature so as to either "maximize" or "increase" the selected feature, or to "minimize" or "decrease" the selected feature, according to occupant preference. In a particular embodiment, a visual and/or touch interface may display a "sliding scale" control or status bar, for example, as shown below:

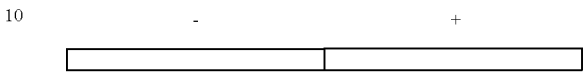

RIDE SMOOTHNESS

This enables an occupant to affect a ride quality feature by pressing a button or touching the screen so as to adjust the ride quality feature status indicated by the status bar.

After the control system 12 receives the occupant selection of a ride quality feature (i.e., after occupant feedback is acquired), control passes to block 209 for implementation of the occupant feedback. In block 209, the control system 12 implements occupant feedback relating to a ride quality feature. In block 260, the vehicle control system executes a maneuver or control command which implements at least one control scheme or control parameter which has been revised in an attempt to provide a desired ride quality effect.

In block 270, following the execution of this maneuver or control command, the computing device 101 queries the occupant regarding the ride quality. If the occupant finds the revised ride quality acceptable, control may revert to block 320, which exits the ride quality feature adjustment routine. If the occupant finds the revised ride quality unacceptable, control may pass to block 280, in which the occupant is queried regarding whether further revisions to the ride quality feature are desired at the present time. If further revisions to the currently selected ride are desired, control may pass to step 208, in which further feedback is elicited and implemented as previously described. If further revisions are not desired, control may pass to block 300, in which the occupant is queried regarding as to whether she desires to return the ride quality features to the default settings. This enables (in block 310) the ride quality settings to be returned to default settings without restarting the vehicle. Otherwise, the control parameters corresponding to the revised ride quality will be saved in memory. The ride quality adjustment routine is then exited at block 320.

As the control system repeatedly executes loop 208-280, the ride quality profile is constantly updated to reflect the current control parameter states. Also, due to the changes implemented in the control parameters, the ride quality is improved with each passage through the loop.

FIG. 7 shows one embodiment of a method of implementing occupant feedback relating to a selected ride quality feature, as specified in block 209. In block 220, the computing device 101 determines which vehicle control parameters affect the selected ride quality feature. For example, if in block 208 the occupant selected "Ride Smoothness" as the ride quality feature to be adjusted, the computing device 101 would determine which vehicle control parameters affect "Ride smoothness". The control parameters relating to each ride quality feature may be found, for example, in lookup tables stored in memory. For example, a lookup table may include a list of control parameters associated with each ride quality feature as shown below:

| RIDE QUALITY FEATURE | CONTROL PARAMETERS |
|---|---|
| Ride smoothness | Acceleration/deceleration rate |
| | Road speed during turns |
| | turn radius |
| | suspension stiffness |
| | steering wheel turn speed |

In block 230, the computing device determines which actuatable vehicle sub-systems and/or components affect the pertinent control parameters. For example, for the "Ride Smoothness" ride quality feature, the computing device would determine which actuatable vehicle sub-systems and/or components affect acceleration/deceleration rate, road speed during turns, turn radius, suspension stiffness, and steering wheel turn speed. The actuatable vehicle sub-systems and/or components which affect each of these control parameters may be found, for example, in lookup tables stored in memory. For example, a lookup table may include a list of actuatable vehicle sub-systems and/or components associated with each control parameter as shown below:

| CONTROL PARAMETER | ACTUATABLE SYSTEM/COMPONENT |
|---|---|
| Acceleration/deceleration rate | throttle control system |
| | braking control system |
| Road speed during turns | throttle control system |
| turn radius | steering control system |
| suspension stiffness | active suspension system |
| steering wheel turn speed | steering control system |

Although each of the control parameters listed above are affected or implemented by a single actuatable vehicle sub-system or component, in certain cases a control parameter may be affected or implemented by a combination of one or more actuatable vehicle sub-systems or components.

In block 240, the computing device 101 determines how to vary the pertinent control parameter(s) in order to implement occupant feedback and provide the desired modifications to vehicle operation. As known in the pertinent art, control schemes or routines used for automated control of the various actuatable vehicle systems and/or components may be in the form of look up tables, formulas, functions, pre-determined response curves, algorithms or any other suitable form. Theses control schemes may be varied by the computing device 101 to implement the feedback provided by the occupant. The processor adjusts the control parameter control scheme so as to influence the pertinent control parameters in the direction indicated by occupant feedback on the related ride quality features.

For example, if the occupant desires that the vehicle accelerate and/or decelerate more gently or gradually, the control scheme for throttle control may be modified to reduce vehicle acceleration and/or deceleration curves during normal driving. Such modifications may be implemented for specific parts of a predetermined or frequently traveled driving route (for example a driving route between the driver's work and home). Thus, after the control scheme has been revised, the same inputs or conditions that resulted in a first vehicle operation prior to revision of the control scheme will result in a second, different vehicle operation after revision of the control scheme.

In one example, if the occupant desires modify the vehicle control system so that the vehicle turns corners more gently during driving, the occupant may instruct the vehicle to "turn corners more gently". The control system may then determine which control parameters affect turning or corners (for example, turn radius and road speed during the turn), determine which sub-systems and/or components (for example, throttle control and steering control) affect these control parameters, and perform suitable modifications of the control routines controlling throttle and steering control. As a result, the next turn executed by the vehicle during normal driving may be slower and have a larger radius than a previous, similar turn executed prior to implementation of occupant feedback.

Control schemes may be modified by, for example, changing the output values stored in a lookup table for an associated input value, or incrementing or decrementing the values of constants added to formulae or functions for purposes of making slight adjustments to the end values. Pertinent numerical values may be incremented or decremented by a fixed, small amount to enable greater flexibility in modifying the control parameters.

Also, some desired revisions to a ride quality feature may exceed limits imposed on the ride quality feature. In addition, some desired revisions to a ride quality feature may require changes to one or more associated vehicle control parameters which exceed the limits imposed on the control parameters. Such limitations may relate to safety considerations, vehicle structural considerations, or any other pertinent considerations. For example, control schemes employed for controlling road speed may result in the maximum speed of the vehicle being limited responsive to such factors as road conditions, vehicle brake conditions, distance between the vehicle and another vehicle in front of the vehicle, etc. Thus, any of the computing devices described herein may also store limitations applicable to control parameter values and/or ride quality features. The various computing devices may be configured to access and utilize these limitations during processing of sensor and other control-related information, as well as during modification of control schemes during implementation of occupant feedback, to ensure that pertinent safety limitations are not exceeded during operation of the vehicle. Accordingly, the computing system may be configured to execute control scheme revisions in accordance with any applicable limits on the ride quality features and control parameters.

The actuatable vehicle systems and/or components may be controlled so as to vary associated control parameters incrementally. Also, a single control parameter may be varied or multiple control parameters pertinent to the ride quality feature may be varied simultaneously. In instances where control parameter changes needed to implement occupant feedback conflict with each other or would tend to work against each other, a single control parameter may be varied and the resulting effect on ride quality determined by the occupant, while the other control parameters are maintained in their existing forms. If variation of this first control parameter does not produce the desired effect on ride quality, the first control parameter may be adjusted back to a default condition or value, and a different control parameter may be varied. For this purpose, the order in which the control parameters will be varied may be prioritized and incorporated into the lookup table or other control scheme. Protocols implementing any of a variety of alternative parameter variation schemes or priorities may be implemented, depending on the requirements of a particular application.

In block 245, after determining how to vary the pertinent control parameter(s), the computing device 101 modifies the occupant ride quality profile to store the control parameter revisions about to be implemented.

In block 250, the computing device 101 varies control parameter(s) from the current values to implement occupant feedback (for example, by revising the pertinent control schemes as described herein). The control schemes may reside on the vehicle controller 101 or the control schemes may be stored in a memory located in one of specialized controllers 16, 18 or in one of the actuatable devices 20, 22, 24. Block 250 may be executed simultaneously with block 245.

The RL approach just described may be used to build or modify an individual ride quality profile which is distinctive to a particular vehicle occupant. The ride quality profile may contain, for example, such information as the identity of the occupant and information detailing any variable values, response curves, etc. relating to pertinent control parameters and necessary to provide a ride quality feature level deemed acceptable by the occupant. The ride quality profile may contain any other pertinent information.

In a particular embodiment, a single occupant may establish and maintain multiple ride quality profiles from which a profile may be selected for a pending ride. For example, the occupant may maintain a first profile for a more relaxed, leisurely or comfortable (i.e., "smoother") ride, which may require a relatively longer time period to reach a destination (e.g., a more relaxed weekend ride). The occupant may also maintain a second ride profile usable in situations where ride smoothness is less important than reaching a destination in as little time as possible (e.g., a ride to/from work). If an occupant has multiple profiles stored in the control system, the interface may be configured to offer the occupant the option of choosing between the profiles.

In a particular embodiment, the vehicle control system may also be configured to receive and implement occupant feedback after a ride has ended, instead of (or in addition to) during the ride. Referring to FIG. 3, after activating the HMI, the occupant may initiate communication with the control system by requesting that the HMI display the most recent ride to the occupant, so that the occupant may provide feedback on aspects of the ride. If the occupant requests review of the most recent ride, control moves to block 340 (FIG. 4).

Figure 4:
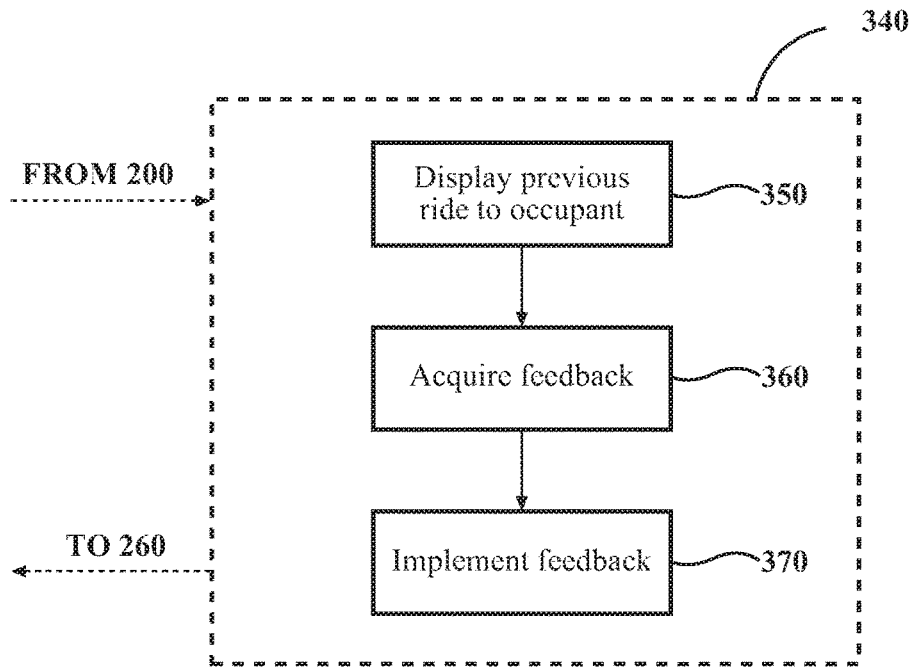
FIG. 4 is a flow diagram illustrating a portion of another example method of eliciting and implementing feedback on a ride quality feature from a vehicle occupant.

Referring to FIG. 4, if a vehicle occupant desires to implement occupant feedback after a ride has ended, in block 350, the computing device 101 displays (through the HMI 109) the previous ride to the occupant.

In block 360, in a step similar to step 208 previously described, the computing device 101 acquires occupant feedback relating to a ride quality feature. For example, the occupant is prompted during the display of the previous ride to select the portion or portions of the previous ride in which the ride quality was considered deficient. After the computing device 101 receives the occupant selection of a ride quality feature, control passes to block 370 for implementation of the occupant feedback.

In block 370, in a step similar to step 209 previously described, the computing device 101 implements occupant feedback relating to a ride quality feature. Control then passes to step 260 where the vehicle control system executes a maneuver or control command which implements at least one control scheme which has been revised to change an associated control parameter so as to provide a desired ride quality effect, as previously described.

Figure 5:
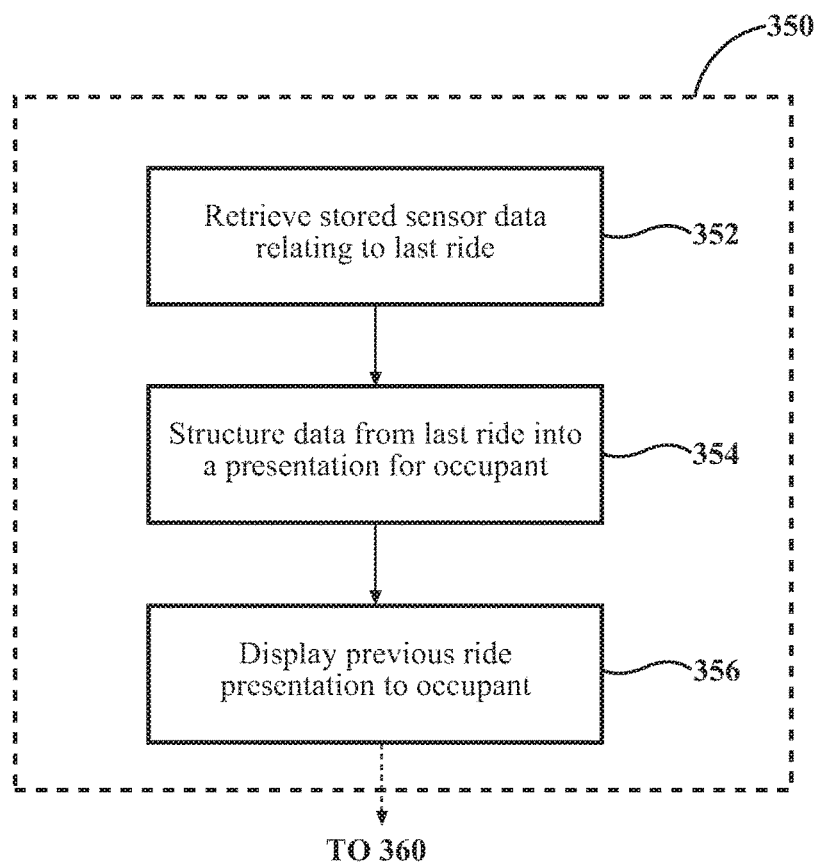
FIG. 5 is a flow diagram illustrating a method of displaying a previous ride to the vehicle occupant.

FIG. 5 shows one embodiment of displaying a previous ride to the vehicle occupant, as specified in block 350. Referring to FIG. 5, in block 352, to display the most recent ride to the occupant, the computing device 101 retrieves stored sensor data relating to the last ride.

In block 354, this data is structured by the computing device 101 into a form presentable to the occupant, for example, using a visual interface.

In block 356, the representation of the previous ride is displayed to the occupant. Control then passes to block 360 for acquisition of feedback relating to ride quality features.

Figure 6:
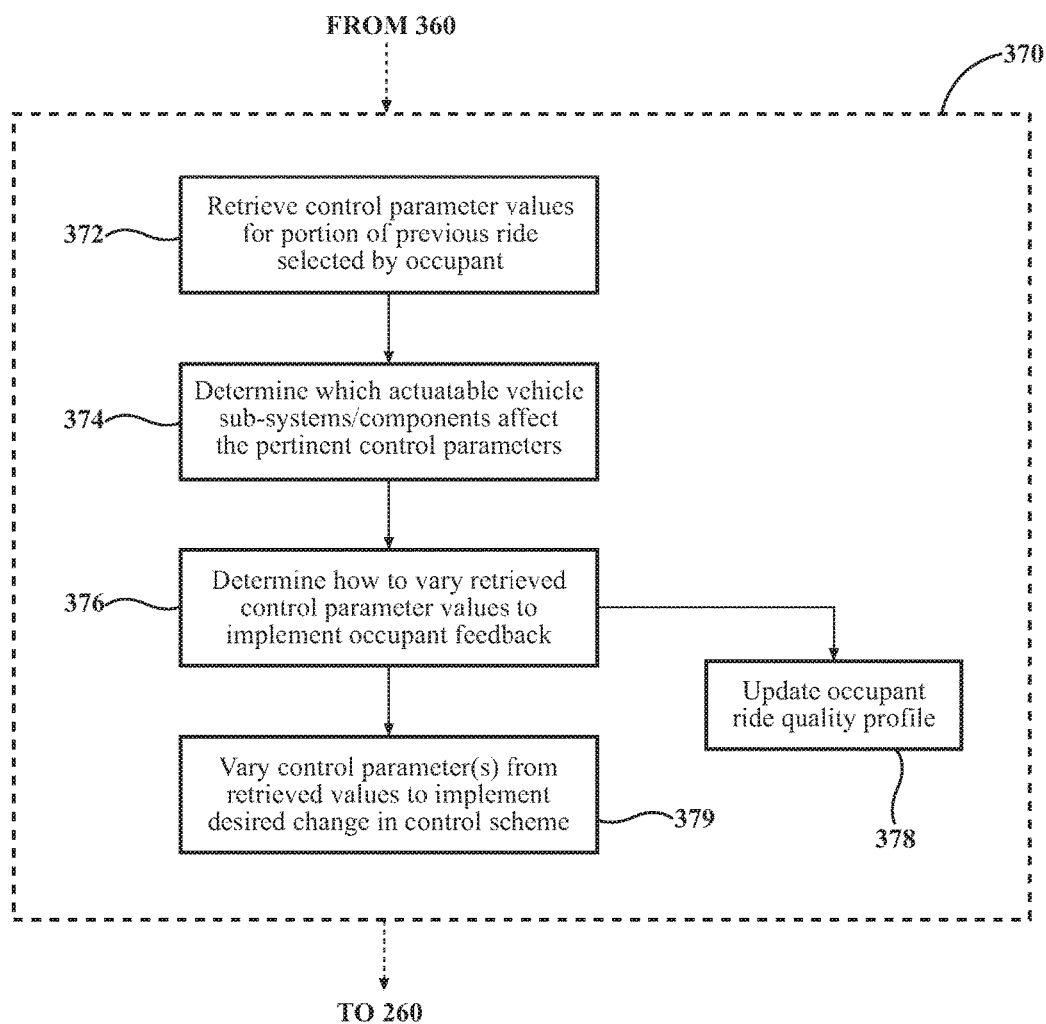
FIG. 6 is a flow diagram illustrating shows a method of implementing occupant feedback relating to an occupant-selected ride quality feature.

FIG. 6 shows one embodiment of a method of implementing occupant feedback relating to a selected ride quality feature, as specified in block 370. In block 372, the computing device 101 retrieves control parameter values for the portion of the previous ride selected by the occupant. In block 374, in a block similar to previously described block 230, the computing device 101 determines which actuatable vehicle sub-systems and/or components affect the pertinent control parameters. In block 376, in a block similar to previously described block 240, the computing device 101 determines how to vary the retrieved control parameter values so as to implement the occupant feedback. In block 378 (similar to previously described block 245), after determining how to vary the pertinent control parameter(s), the computing device 101 modifies the occupant ride quality profile to store the control parameter revisions about to be implemented. In block 379 (similar to previously described block 250), the computing device 101 varies the pertinent control parameter(s) from the retrieved values to implement occupant feedback. Block 378 may be executed simultaneously with block 379.

In particular embodiments, the vehicle control system may also be configured to provide a vehicle occupant with real-time feedback on aspects of a ride during the ride. If the vehicle is operated in a manner that appears to be inconsistent with the occupant's ride quality preferences as recorded in the occupant's ride profile, or if the vehicle is operated in a manner otherwise objectionable to the occupant, the occupant may operate the HMI 109 to query the computing device 101 regarding the vehicle operation performed. For example, the occupant may query the control system as to why the vehicle just made a sudden stop. The system may then access recorded sensor data and other pertinent information relating to actuatable systems controlling automated acceleration and deceleration. The sensor data and other information may reviewed by one or more system processors to determine the reason for the sudden stop. A series of pre-programmed messages may be stored in memory for answering the most likely occupant queries.

Each message may relate to a possible vehicle operation executed pursuant to one of the vehicle control parameters, and may be correlated with one or more sensor readings which tend to occur in particular driving situations. For example, the vehicle may execute a sudden stop because an object suddenly entered the road in front of the vehicle, or because the vehicle in front suddenly stopped. A first set of sensor readings may be associated with the first occurrence, and a second, different set of sensor readings may be associated with the second occurrence. Correspondingly, a first stored response (for example, "We stopped because on object suddenly entered the road in front of us") may be transmitted to the occupant if an object suddenly entered the road in front of the vehicle, and a second stored response (for example, "We stopped because the car in front of us suddenly stopped") may be transmitted to the occupant if the vehicle in front suddenly stopped.

The method just described for implementing vehicle occupant feedback may be employed in a vehicle control system incorporating any of various levels of automation. For example, in a vehicle not equipped for fully automated driving but rather incorporating only one autonomous driving system (for example, an adaptive cruise control system or an automatic steering system, each of which are controlled by an associated specialized controller enabling longitudinal or lateral driving automation functions, respectively), the specialized controller may be configured to perform the method steps described herein for receiving and implementing feedback relating to ride quality features which may be affected by operation of the autonomous driving system. The specialized controller would be in operative communication with the sensor array and would include all of the components necessary to perform the feedback-receiving and implementation steps described herein. The specialized controller could adjust or vary any control parameters affected by the actuatable component operated by the controller, in the manner previously described. Thus, in this case, the breadth of ride quality features that may be influenced by the occupant may be limited by the type of actuatable elements configured for autonomous operation.

It should be understood that the preceding is merely a detailed description of various embodiments of this invention and that numerous changes to the disclosed embodiments can be made in accordance with the disclosure herein without departing from the spirit or scope of the invention. For example, the computing device 101 and other associated elements (e.g., those implementing analysis of the voice feedback) may reside in the cloud, if on-board processing capabilities are limited. Thus, the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle control system configured for autonomous control of at least one actuatable vehicle system or component, the control system comprising:
   one or more sensors disposed on a vehicle;
   a computing device in communication with the one or more sensors, the computing device including one or more processors for controlling operation of the computing device, and
   a memory for storing data and program instructions usable by the one or more processors, wherein the one or more processors are configured to execute instructions stored in the memory to:
   acquire feedback relating to a ride quality feature from a vehicle occupant;
   identify vehicle control parameters affecting the ride quality feature;
   identify at least one autonomously controlled vehicle system or component affecting values of the identified vehicle control parameters;
   determine revisions to the vehicle control parameters necessary to implement the feedback relating to the ride quality feature; and
   control operation of the at least one autonomously controlled system or component so as to effect the control parameter revisions needed to implement the feedback.

2. The control system of claim 1 wherein the at least one autonomously controlled vehicle system or component comprises one of an active suspension system, a throttle control system, a steering control system, and a braking control system.

3. A computer-implemented method of controlling at least one vehicle system or component, comprising steps of:
   acquiring, from a vehicle occupant, feedback relating to a ride quality feature affected by operation of the at least one system or component; and
   controlling operation of the at least one system or component responsive to the feedback.

4. The method of claim 3 wherein the step of acquiring feedback comprises a step of prompting selection of a ride quality feature by the vehicle occupant from a menu.

5. The method of claim 3 wherein the step of controlling operation of the at least one system or component comprises a step of determining which vehicle control parameter(s) affect the ride quality feature.

6. The method of claim 5 wherein the step of controlling operation of the at least one system or component further comprises a step of determining how to vary the vehicle control parameter(s) so as to implement the occupant feedback.

7. The method of claim 6 wherein the step of controlling operation of the at least one system or component further comprises a step of varying the control parameter(s) so as to implement occupant feedback.

8. The method of claim 3 further comprising a step of, prior to the step of acquiring feedback, displaying a representation of a previous vehicle ride to the vehicle occupant.

9. The method of claim 8 wherein the step of acquiring feedback comprises the step of prompting the occupant to select a portion of the previous ride on which to provide feedback.

10. The method of claim 9 wherein the step of controlling operation of the at least one system or component comprises a step of retrieving, from a memory, control parameter values pertaining to the selected portion of the previous ride.

11. A computing device configured for communication with at least one autonomously controllable actuatable vehicle system or component, the computing device comprising one or more processors for controlling operation of the computing device, and a memory for storing data and program instructions usable by the one or more processors, wherein the one or more processors are configured to execute instructions stored in the memory to:
   acquire, from a vehicle occupant, feedback relating to a ride quality feature affected by operation of the at least one autonomously controlled system or component; and
   modify autonomous control of the at least one system or component responsive to the feedback.

12. The computing device of claim 11 wherein the one or more processors are configured to execute instructions stored in the memory to determine which vehicle control parameter(s) affect the ride quality feature.

13. The computing device of claim 12 wherein the one or more processors are configured to execute instructions stored in the memory to determine how to vary the vehicle control parameter(s) so as to modify autonomous control of the at least one system or component responsive to the feedback.

14. The computing device of claim 11 wherein the one or more processors are configured to execute instructions stored in the memory to display a representation of a previous vehicle ride to a vehicle occupant.

15. The computing device of claim 14 wherein the one or more processors are configured to execute instructions stored in the memory to prompt selection of a ride quality feature by a vehicle occupant from a menu.

16. A vehicle including a vehicle control system in accordance with claim 1.

17. A vehicle including a computing device in accordance with claim 11.

\* \* \* \* \*